(12) United States Patent
Vicente et al.

(10) Patent No.: US 9,773,179 B2
(45) Date of Patent: Sep. 26, 2017

(54) VEHICLE OPERATOR MONITORING SYSTEM AND METHOD

(71) Applicants: GM GLOBAL TECHNOLOGY OPERATIONS LLC, Detroit, MI (US); Carnegie Mellon University, Pittsburgh, PA (US)

(72) Inventors: Francisco Vicente, Pittsburgh, PA (US); Zehua Huang, Pittsburgh, PA (US); Xuehan Xiong, Pittsburgh, PA (US); Fernando De La Torre, Pittsburgh, PA (US); Wende Zhang, Troy, MI (US); Dan Levi, Kyriat Ono (IL); Debbie E. Nachtegall, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/006,763

(22) Filed: Jan. 26, 2016

(65) Prior Publication Data

US 2016/0224852 A1    Aug. 4, 2016

Related U.S. Application Data

(60) Provisional application No. 62/109,654, filed on Jan. 30, 2015.

(51) Int. Cl.
| | |
|---|---|
| G08B 23/00 | (2006.01) |
| G06K 9/00 | (2006.01) |
| B60Q 9/00 | (2006.01) |
| G06T 7/73 | (2017.01) |

(52) U.S. Cl.
CPC .......... *G06K 9/00845* (2013.01); *B60Q 9/00* (2013.01); *G06K 9/0061* (2013.01); *G06K 9/00268* (2013.01); *G06T 7/75* (2017.01); *G06T 2207/30201* (2013.01); *G06T 2207/30268* (2013.01)

(58) Field of Classification Search
CPC ....................... G06K 9/00845; G06K 9/00597
USPC ......................................................... 340/576
See application file for complete search history.

(56) References Cited

U.S. PATENT DOCUMENTS

| | | | |
|---|---|---|---|
| 7,692,551 B2 * | 4/2010 | Bonefas | G06T 7/0004 340/575 |
| 2012/0242819 A1 * | 9/2012 | Schamp | G08B 21/06 348/78 |
| 2014/0204193 A1 | 7/2014 | Zhang et al. | |
| 2014/0205143 A1 | 7/2014 | Zhang et al. | |

* cited by examiner

*Primary Examiner* — Qutbuddin Ghulamali
(74) *Attorney, Agent, or Firm* — Quinn IP Law

(57) ABSTRACT

A method for monitoring a vehicle operator can be executed by a controller and includes the following steps: (a) receiving image data of a vehicle operator's head; (b) tracking facial feature points of the vehicle operator based on the image data; (c) creating a 3D model of the vehicle operator's head based on the facial feature points in order to determine a 3D position of the vehicle operator's head; (d) determining a gaze direction of the vehicle operator based on a position of the facial feature points and the 3D model of the vehicle operator's head; (e) determining a gaze vector based on the gaze direction and the 3D position of the vehicle operator's head; and (f) commanding an indicator to activate when the gaze vector is outside a predetermined parameter.

6 Claims, 4 Drawing Sheets

VEHICLE OPERATOR MONITORING SYSTEM AND METHOD

CROSS-REFERENCE TO RELATED APPLICATION

This application claims priority to, and the benefit of, U.S. Provisional Patent Application No. 62/109,654, filed Jan. 30, 2015, which is hereby incorporated by reference in its entirety.

TECHNICAL FIELD

The present disclosure relates to a vehicle operator monitoring system and method.

BACKGROUND

While driving a vehicle, a driver typically wants to gaze forward in order to observe what lies in front of the vehicle. While driving, however, a driver may direct its attention elsewhere (i.e., not directly forward) in order to perform other typical driving functions, such as looking toward the rearview mirror. Accordingly, the driver may desire to know if he/she is inadvertently gazing in another direction (i.e., not toward the front of the vehicle). It is therefore useful to develop a system capable of alerting the driver if he/she is not gazing forward.

SUMMARY

The present disclosure relates to a method for monitoring a vehicle operator. In particular, the presently disclosed method can be used to determine whether the vehicle operator has his/her eyes on or off the road. In an embodiment, the method includes the following steps: (a) receiving, via a controller, image data of the vehicle operator's head; (b) tracking, via the controller, facial feature points in the vehicle operator's face based on the image data; (c) creating, via the controller, a three-dimensional (3D) model of the vehicle operator's head based, at least in part, on the facial feature points in order to determine a 3D position and orientation of the vehicle operator's head; (d) determining, via the controller, a gaze direction of the vehicle operator based on a position of at least some of the facial feature points and the 3D model of the vehicle operator's head; (e) determining, via the controller, a gaze vector based on the gaze direction and the 3D position of the vehicle operator's head and eyes; and (f) commanding, via the controller, an indicator to activate when the gaze vector is outside a predetermined parametrized area. The present disclosure also describes a vehicle operator monitoring system capable of executing the steps described above. In addition, any suitable vehicle may include the vehicle operator monitoring system described in this disclosure.

In an embodiment, the method for monitoring a vehicle operator includes the following steps: (a) determining, via a controller, a gaze vector based on a gaze direction and a three-dimensional (3D) position of a head of a vehicle operator; (b) determining, via the controller, whether at least one of the gaze vector or a head pose intersects a predetermined plane of a vehicle; and (c) commanding, via the controller, an indicator to activate when the gaze vector is outside a predetermined parameter.

The above features and advantages and other features and advantages of the present teachings are readily apparent from the following detailed description of the best modes for carrying out the teachings when taken in connection with the accompanying drawings.

DETAILED DESCRIPTION

Figure 1:
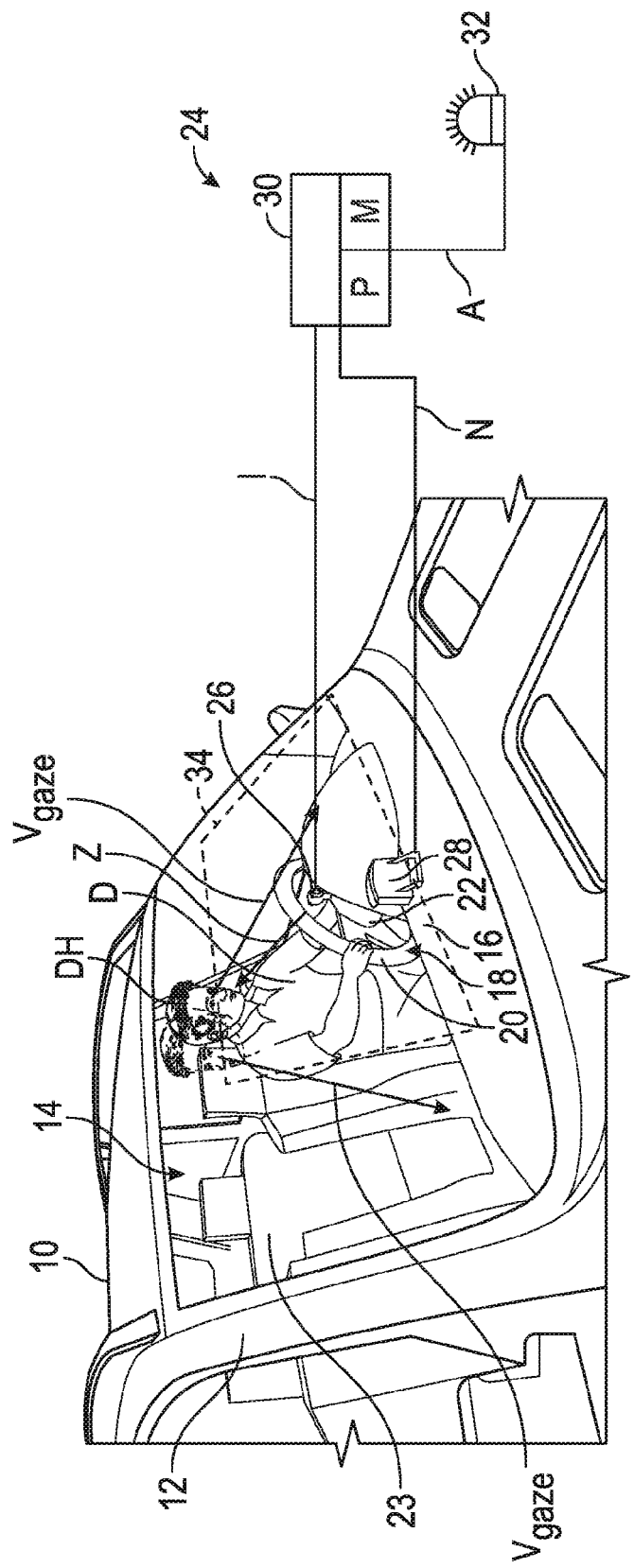
FIG. 1 is a schematic, perspective view of a vehicle including a vehicle operator monitoring system.

Referring to the drawings, wherein like reference numbers correspond to like or similar components throughout the several figures, FIG. 1 schematically illustrates a vehicle 10, such as a car, truck, or train. Although the drawings illustrate a land vehicle, it is contemplated that the vehicle 10 may be a flying vehicle, such as an airplane or a spacecraft, or a watercraft, such as a boat or a submarine. Regardless, the vehicle 10 includes a vehicle body 12 defining a passenger compartment 14. The passenger compartment 14 can accommodate at least a vehicle operator D (e.g., a driver). The vehicle 10 further includes a translucent windshield 23 coupled to the vehicle body 12. The windshield 23 allows the vehicle operator D to see in front of the vehicle 10 while the vehicle operator D is inside the passenger compartment 14. In addition to the windshield 23, the vehicle 10 includes an instrument panel 16 (e.g., a dashboard) inside the passenger compartment 14. The instrument panel 16 may have a plurality of instruments for controlling one or more features of the vehicle 10. The vehicle 10 further includes a steering assembly 18 inside the passenger compartment 14. The steering assembly 18 serves to steer the vehicle 10 and includes a steering wheel 20 and a steering column 22 coupled to the steering wheel 20. The steering wheel 20 can turn relative to the steering column 22. During operation of the vehicle 10, the vehicle operator D can turn the steering wheel 20 to steer the vehicle 10 in the desired direction.

The vehicle 10 further includes a vehicle operator monitoring system 24 for monitoring the gaze direction of the vehicle operator D in real time. The vehicle operator monitoring system 24 can monitor the vehicle operator's gaze direction day or night even when the passenger compartment 14 is completely dark. To do so, the vehicle operator monitoring system 24 includes at least one camera 26 for monitoring the vehicle operator D and at least one infrared (IR) illuminator 28 for illuminating the vehicle operator's head with IR light. Although the drawings show only one camera 26, it is envisioned that the vehicle operator monitoring system 24 may include more than one camera 26. Irrespective of the quantity, the camera 26 may be a monocular video camera configured to capture images in real time and may specifically be a charge coupled device (CCD) camera in order to minimize costs. The vehicle operator system 24 may monitor the vehicle operator (including the eyes) using the monocular camera 26 and without the need of end-user calibration, thereby improving its functioning. The camera 26 can generate image data I based on the captured images and, in the depicted embodiment, the camera 26 is coupled to the steering column 22 of the steering assembly 18 in order to facilitate the estimation of gaze angles, such as pitch (which is relevant for detecting when the vehicle operator D is not looking forward) and to simplify the assembly of the vehicle operator monitoring system 24 onto the vehicle 10. However, the camera 26 can be coupled to any other part of the vehicle 10 (e.g., vehicle body 12) so long as the lenses of the camera 26 are pointing toward the vehicle operator's head DH as indicated by arrow Z, which represents the camera optical axis Z. The camera optical axis Z extends through the field of view (FOV) of the camera 26. The camera 26 does not have an IR filter in order to enhance the camera's sensitivity to IR illumination (e.g., sunlight and artificial IR illumination provided by the IR illuminator 28).

The IR illuminator 28 can emit infrared radiation toward the vehicle operator's head DH (which includes the vehicle operator's face), thereby allowing the camera 26 to capture images in total darkness. As a non-limiting example, the IR illuminator 28 may include Light Emitting Diodes (LEDs) capable of emitting infrared radiation. The LEDs of the IR illuminator 28 do not need to be arranged in a special geometric arrangement to produce a bright pupil effect, because the vehicle operator monitoring system 24 does not rely on the bright pupil effect to determine the vehicle operator's gaze direction. In the depicted embodiment, the IR illuminator 28 is coupled to the instrument panel 16 inside the passenger compartment 14, such that the IR illuminator 28 emits IR radiation toward the vehicle operator's face without impairing the vehicle operator's vision.

The vehicle operator monitoring system 24 further includes a controller 30 in communication, such as electronic communication, with the IR illuminator 28 and the camera 26. The controller 30 may include hardware elements such as a processor (P), memory (M), circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random access memory (RAM), electrically-erasable programmable read-only memory (EEPROM), and the like. A vehicle operator monitoring method 100 described below may be executed by the processor (P). By using the method 100, the vehicle operator monitoring system 24 monitors the vehicle operator night and day and can work with all ethnicities, age groups and genders.

The controller 30 can send a signal (i.e., the illuminator signal N) to the IR illuminator 28 to turn the IR illuminator 28 on or off. Alternatively, the vehicle operator can turn the IR illuminator 28 on and off using a switch in the IR illuminator 28. The camera 26 can capture images of the vehicle operator's head DH at a predetermined rate (e.g., 30 frames per second (FPS)) and generates image data I indicative of the captured images. The image data I can be represented as matrices, in which each element of the matrix corresponds to a single pixel in the image. The camera 26 can send the image data I to the controller 30, and the controller 30 in turn can receive the image data I.

The vehicle operator monitoring system 24 also includes an indicator 32 in communication (e.g., electronic communication) with the controller 30. The indicator 32 can be an audible indicator, such as a speaker, and/or a visual indicator, such as a visible light source, suitable for notifying the vehicle operator D that his/her gaze direction is outside a predetermined plane 34 of the vehicle 10 (e.g., the eyes are off the road). The predetermined plane 34 may be an area of the windshield 23 or another part of the vehicle 10. Further, the indicator 32 may be inside the passenger compartment 14 to allow the vehicle operator D to listen or observe the alarm (e.g., sound or emitted visible light) provided by the indicator 32. The controller 30 can control the activation of the indicator 32. For example, the controller 30 can send a signal (i.e., the alarm signal A) to the indicator 32 in order to activate (e.g., produce a sound and/or emit a visible light) when the vehicle operator's gaze vector $v_{gaze}$ does not intersect the predetermined area 34 of the windshield 23. In the present disclosure, the term "gaze vector" refers to a vector that is indicative of the vehicle operator's gaze direction. If the gaze vector $v_{gaze}$ intersects the predetermined plane 34 of the windshield 23, then the controller 30 does not activate the indicator 32. As discussed below, the controller 30 is specially programmed to execute a method 100 to determine whether the vehicle operator's gaze vector $v_{gaze}$ does not intersect the predetermined plane 34 of the windshield 23 in order to determine, for example, whether the vehicle operator's eyes are on the road or off the road.

Figure 2:
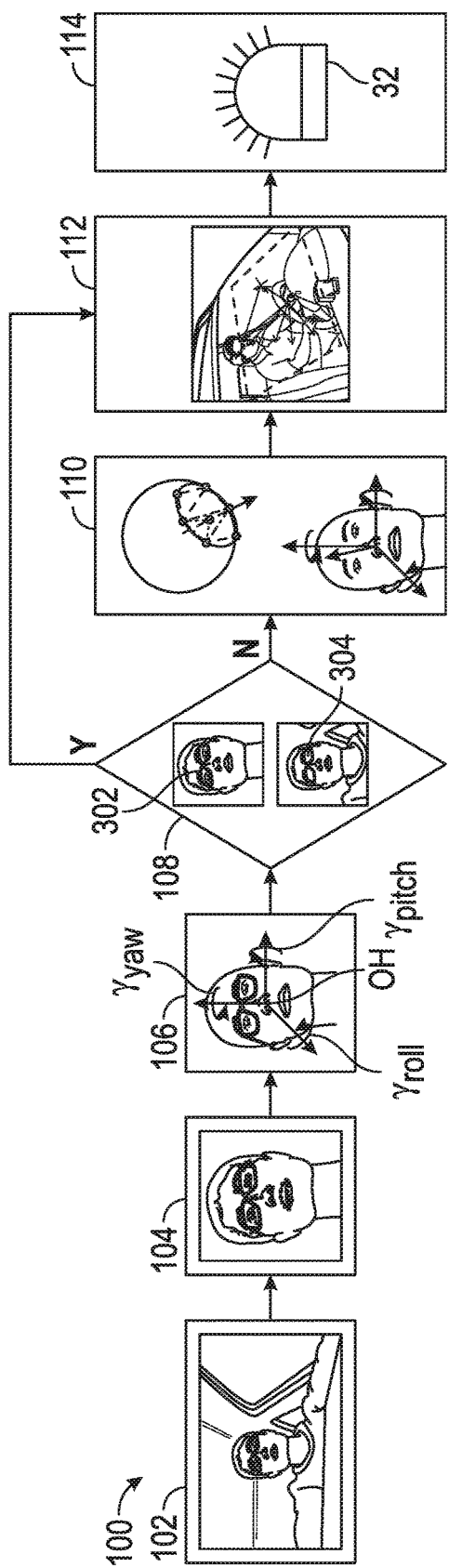
FIG. 2 is a flowchart of a method for monitoring a vehicle operator using the vehicle operator monitoring system shown in FIG. 1.

FIG. 2 is a flowchart of a method 100 for monitoring the vehicle operator D. In particular, the controller 30 can execute the method 100 to monitor the vehicle operator's gaze in real time. The method 100 begins with step 102 (i.e., the image acquisition step). In step 102, the camera 26 captures images of the vehicle operator's head DH in real time (e.g., including the vehicle operator's face DF). Then, the camera 26 generates image data I representative of the captured images and sends the image data I to the controller 30. The controller 30 receives the image data I, which is representative of the vehicle operator's head DH (including the vehicle operator's face DF). Therefore, step 102 entails monitoring the vehicle operator's head DH using the camera 26. It is envisioned that the controller 30 may command the camera 26 to capture images of the vehicle operator's head DH and send the image data Ito the controller 30. The image data I are then stored on the memory (M) of the controller 30. In step 102, the controller 30 can also command the IR illuminator 28 to turn off or on depending on whether visible light is detected in the passenger compartment 14. The visible light may be detected using a dark sensor, such as a photodetector. For example, the controller 30 can command the IR illuminator 28 to turn on if the dark sensor (e.g., photodetector) does not detect visible light in the passenger compartment 14. Thus, step 102 also entails illuminating the vehicle operator's head with IR radiation from the IR illuminator 28. After acquiring at least one image of the vehicle operator's head DH using the camera 26, the method 100 proceeds to step 104.

Figure 3:
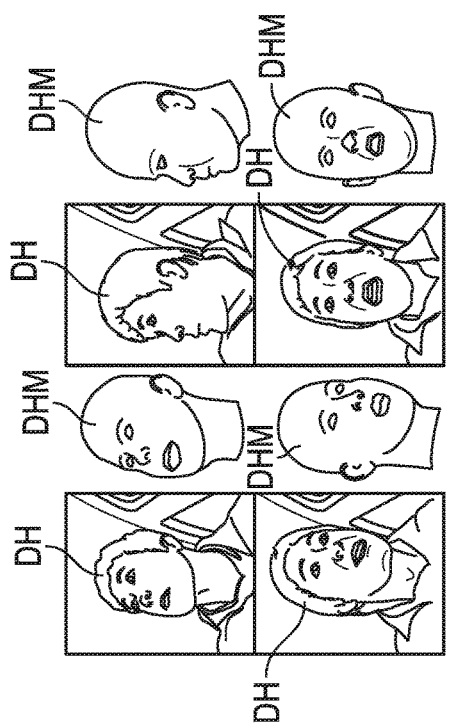
FIG. 3 is a schematic, perspective view of an image of the vehicle operator, depicting landmarks representing facial features (i.e., facial feature points) of the vehicle operator.
Figure 7A:
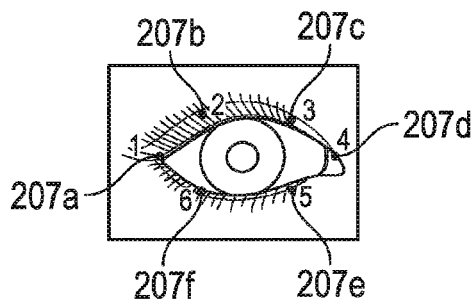
FIG. 7A is a schematic illustration depicting facial feature points proximate to the vehicle operator's eyes.

Step 104 entails detecting the vehicle operator's face DF and tracking certain facial features 207-211 of the vehicle operator D within the images captured in step 102 as shown in FIG. 3. As used herein, the term "facial feature points" may be referred to as landmarks and can include points surrounding eyes, nose, and mouth regions as well as points outlining contoured portions of the detected face DF of the vehicle operator D. In the embodiment illustrated in FIG. 3, the controller 30 can identify fifty-one facial feature points 207-211, and the plurality of facial feature points 207-211 include feature points proximate to the vehicle operator's eyes 207, facial feature points proximate to the vehicle operator's nose 208, facial feature points proximate to the vehicle operator's mouth 209, and facial feature points proximate to the vehicle operator's eyebrows 210, and facial feature points in the center of each of the vehicle operator's pupil 211. In step 104, the controller 30 may first detect the vehicle operator's face DF and then detect and extract a plurality of facial feature points 207-211 from the detected face DF. Next, the controller 30 monitors (or otherwise tracks) the facial feature points 207-211. The facial feature points proximate to the vehicle operator's eyes 207 may include seven points 207a, 207b, 207c, 207d, 207e, 207f around each of the vehicle operator's eyes as shown in FIG. 7A. In the present disclosure, the facial feature points 207a, 207b, 207c, 207d, 207e, 207f are also referred to as eye contour points. The facial features points 207-211 can be detected, extracted from the images, and then monitored using any suitable face tracking technique. As non-limiting examples, the controller 30 can use a Supervised Descent Method (SDM), which may be used to minimize a Non-linear Least Squares (NLS) function, in order to detect and track facial features points 207-211. In one embodiment, the facial feature points 207-211 are extracted from the detected face for a first image frame. For each consecutive image frame subsequent to the first image frame, a candidate region 205 is identified that encompasses the facial feature points 207-211 extracted from one or more previous image input frames. The facial feature points 207-211 can be identified only within the candidate region 205 within each of the consecutive image frames such that processing time is reduced since the vehicle operator's face DF does not need to be detected in each image frame. It is envisioned that other methods may be used to detect and track the facial feature points 207-211. An example of a method for detecting and tracking the facial feature points 207-211 is described in U.S. patent application Ser. No. 14/596,148, filed on Jan. 13, 2015, the entire contents of which are incorporated by reference herein. Another example of a method for detecting and tracking the facial feature points 207-211 is described in U.S. patent application Ser. No. 14/794,165, filed on Jul. 8, 2015, the entire contents of which are incorporated by reference herein. After detecting and tracking the facial feature points 207-211 in the vehicle operator's face DF, the method 100 continues to step 106.

Figure 4:
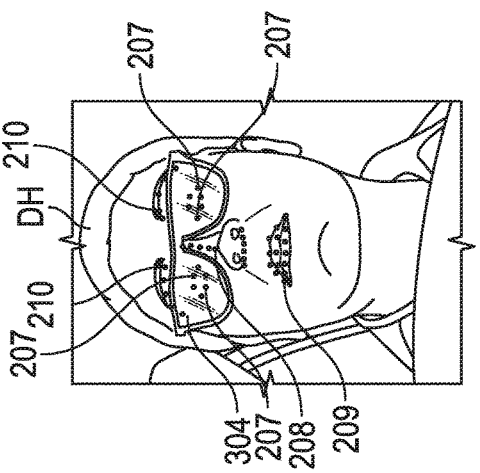
FIG. 4 is a schematic illustration depicting virtual three-dimensional (3D) models of a vehicle operator's head.

Step 106 entails determining, or at least estimating, the head pose of the vehicle operator's head DH (i.e., the 3D position and orientation of the vehicle operator's head DH). To do so, the controller 30 creates a three-dimensional (3D) model DHM of the vehicle operator's head DH based, at least in part, on the facial feature points 207-211 in order to determine a three-dimensional (3D) position, a three-dimensional (3D) rotation, and a three-dimensional (3D) shape of the vehicle operator's head DH as shown in FIG. 4. In particular, in step 106, the controller 30 can determine the vehicle operator's head yaw angle $\gamma_{yaw}$, vehicle operator's head pitch $\gamma_{pitch}$, and the vehicle operator's head roll angle $\gamma_{roll}$ relative to a predetermined head original coordinate system having a predetermined head origin OH. The predetermined head origin OH may be at center of the vehicle operator's head DH.

In real driving scenarios, vehicle operators change their head pose and facial expression while driving. In step 106, a 3D head pose estimation model is used to separately analyze rigid and non-rigid head motion. A "rigid head motion" is a motion of the vehicle operator's head DH from one location to a different location without altering its shape, such as rotation or translation of the vehicle operator's head DH. A "non-rigid head motion" is a motion of the vehicle operator's facial expressions, such as motion of the mouth, eyebrows, and cheeks, among others. In step 106, the controller 30 can create a 3D model DHM of the vehicle operator's head DH (i.e., a 3D head model) based, at least in part, on the facial feature points 207-211. The 3D head model DHM can be represented using a shape vector, $q \in \mathbb{R}^{(3 \cdot p \times 1)}$, concatenating the x, y, z coordinates of all vertices in the facial feature points 207-211. In the shape vector, $q \in \mathbb{R}^{(3 \cdot p \times 1)}$, p represents the number of facial feature points. In an embodiment, p is 49 and includes the facial features points 207-210, but it does not include the two facial feature points in the center of each of the vehicle operator's pupil 211. The 3D head model DHM is constructed by computing PCA on the training dataset from an existing 3D facial expression database for visual computing. This existing 3D facial expression database contains aligned 3D face shapes that have variation in both identity and expression. A new 3D shape (i.e., a new 3D head model) can be reconstructed as a linear combination of eigenvectors $v_i$ and the mean shape q:

$$q = \bar{q} + \sum_i \beta v_i = \bar{q} + V\beta \qquad (1)$$

wherein:
q is a new 3D head model;
$\bar{q}$ is a mean head shape;
$\beta$ is a predetermined shape coefficient;
$v_i$ are the eigenvectors determined using the PCA; and
V is the linear combination of the eigenvectors $v_i$.

The head shape and the head pose are fitted simultaneously by minimizing the difference between the two-dimensional facial feature points 207-210 and the projection of corresponding the 3D points from the 3D model q. In one embodiment, the controller 30 may employ a scaled orthographic projection model to create the 3D head model DHM of the vehicle operator's head DH. To simultaneously fit the head shape and the head pose, the fitting error can be calculated using the following equation:

$$E = \frac{1}{2} \sum_{k=1}^{K=49} \left\| sP(RL_K q + t_{head_p}) - p_k \right\|_2^2 \qquad (2)$$

wherein:
k is the index of the k-th facial feature points 207-210;
P is a projection matrix;
$L_K$ is the selection matrix that selects the vertex corresponding to the kth facial feature points;

R is the rotation matrix defined by the head pose angles;
$t_{head_p}$ is a 3D translational vector of the vehicle operator's head DH relative to the camera's optical center; and
s is a scale factor approximating the perspective image formation.

The overall fitting error E, which is the total fitting error of all the facial feature points 207-210, is minimized with respect to the pose parameters (i.e., the rotation matrix R, the 3D translation vector $t_{head_p}$, scale factor s and shape coefficient β using an alternating optimization approach. This alternating optimization approach to minimize the overall fitting error E can entail alternating between the estimation of the rigid parameters (i.e., the rotation matrix R and scale factor s) and the non-rigid parameter (i.e., shape coefficient β). The steps of this alternating optimization approach monotonically reduce the fitting error E. Because the fitting error function is bounded below, the alternating optimization approach can be used to converge to a critical point, thereby obtaining a head pose estimation and 3D head reconstruction model DHM of the vehicle operator's head DH as shown in FIG. 4.

In the fitting error calculation described above, the 3D head translation vector $t_{head_p}$ can be computed in pixels. However, to determine the vehicle operator's gaze location based on the geometry of the scene, it is useful to map the pixels in centimeters (or any other suitable length unit), thereby obtaining a 3D head translation vector $t_{head}$ in length units. This mapping is performed using a data-driven approach. For fixed focal length of the camera 26, experiments are conducted to collect a set of translation vectors in pixels and their corresponding real length in centimeters. Then, a linear system is solved to obtain the unit mapping, which can be represented by the following equation:

$$t_{head} = A t_{head_p} + b \quad (3)$$

wherein
$t_{head}$ is the 3D head translation vector in length units (e.g., centimeters)
$t_{head_p}$ is the 3D head translation vector in pixels;
A is a linear coefficient to be solved based on the collected data; and
b is a linear coefficient to be solved based on the collected data.

Figure 8:
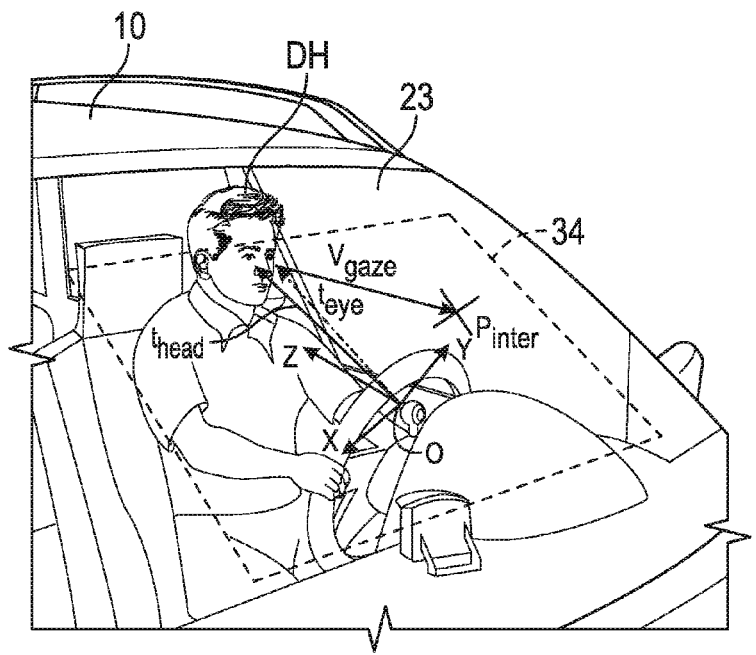
FIG. 8 is a schematic, perspective view of the vehicle shown in FIG. 1, schematically depicting the geometric analysis performed to determine whether the vehicle operator's gaze direction is within a predetermined area of the windshield.

The 3D head vector $t_{head}$ is indicative of the 3D position and orientation of the vehicle operator's head DH relative to the camera coordinate system (x, y, z) (see FIG. 8). In addition to the 3D head vector $t_{head}$, the 3D head model DHM can be used to determine (or at least estimate) a 3D eyes vector $t_{eye}$, one for each eye, which is indicative of the 3D position of the vehicle operator's eyes with respect to the camera coordinate system (x, y, z). The 3D eyes vector $t_{eye}$ is based on the 3D position and orientation of the vehicle operator's head DH relative to the camera coordinate system (x, y, z).

Figure 5:
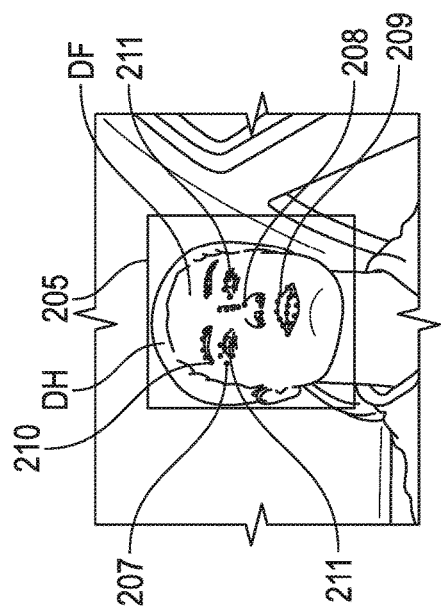
FIG. 5 is a schematic illustration depicting the position of the images captured by a camera relative to a camera optical axis.

In step 106, if the camera 26 employs a scaled orthographic projection model, then the controller 30 may introduce a heuristic compensation to the 3D head model DHM of the vehicle operator's head DH to correct an angular offset caused when the vehicle operator's head DH is offset relative to the camera optical axis Z as shown in FIG. 5. When the vehicle operator's head DH is substantially aligned with the camera optical axis Z, the scaled orthographic projection model can create an accurate 3D model DHM of the vehicle operator's head DH. However, in a car scenario, due to several factors, such as the vehicle operator's height, the seating position, and the fixed tilt of the camera 26, the vehicle operator's head DH may be offset relative to the camera optical axis Z, thereby introducing an angular offset into the estimated head pose rotation. To account for this angular offset, the controller 30 introduces a heuristic compensation of the vehicle operator's head rotation. FIG. 5 schematically shows a heuristic compensation computed for a lateral translation that affects the estimation of the yaw angle $\gamma_{yaw}$. In FIG. 5, for example, the controller 30 can calculate a compensation yaw angle $\alpha_{yaw}$ for a lateral translation according to the following equation:

$$\alpha_{yaw} = \arctan\left(\frac{t_{ax}}{t_{az}}\right) \quad (4)$$

wherein:
$\alpha_{yaw}$ is the compensation yaw angle of the vehicle operator's head DH;
$t_{az}$ the length from the origin O of the camera coordinate system (x, y, z) to a hypothetical 3D head model $DHM_b$ that is aligned with the camera optical axis Z; and
$t_{ax}$ is the length from the center of the hypothetical 3D head model $DHM_b$ to the center of the actual position of the vehicle operators' head DH, which has been translated along a camera horizontal axis x of the camera coordinate system (x, y, z).

In addition to computing the compensation yaw angle $\alpha_{yaw}$, the controller 30 can calculate a compensation pitch angle $\alpha_{pitch}$ for a vertical translation in a similar fashion. As a result, a compensated yaw angle $\Phi_{yaw}^{head}$ and a compensated pitch angle $\Phi_{pitch}^{head}$ can be calculated using the following equations:

$$\Phi_{yaw}^{head} = \gamma_{yaw} - \alpha_{yaw} \quad (5)$$

$$\Phi_{pitch}^{head} = \gamma_{pitch} - \alpha_{pitch} \quad (6)$$

wherein:
$\Phi_{yaw}^{head}$ is the compensated yaw angle;
$\gamma_{yaw}$ is the originally estimated yaw angle;
$\alpha_{yaw}$ is a compensation yaw angle;
$\Phi_{pitch}^{head}$ is the compensated pitch angle;
$\gamma_{pitch}$ is the originally estimated pitch angle; and
$\alpha_{pitch}$ is a compensation pitch angle.

No compensation is required for the vehicle operator's head roll angle $\gamma_{roll}$, because the vehicle operator's head roll angle $\gamma_{roll}$ is less sensitive to translations with respect to the camera optical axis Z than the originally estimated yaw angle $\gamma_{yaw}$ and the is the originally estimated pitch angle $\gamma_{pitch}$. By using 3D head model DHM, the vehicle operator monitoring system 100 can robustly and accurately determine the 3D position and orientation of the vehicle operator's head DH. After determining the 3D position and orientation of the vehicle operator's head DH, the method 100 proceeds to step 108.

Figure 6:
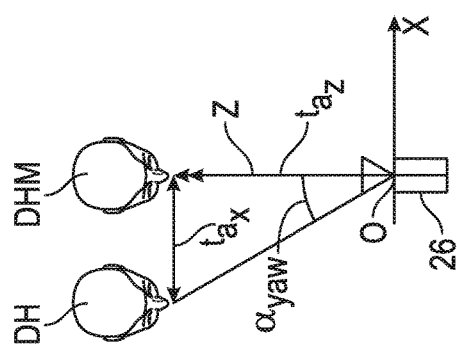
FIG. 6 is a schematic, perspective view of an image of the vehicle operator with sunglasses, depicting the landmarks representing the facial features (i.e., facial feature points) of the vehicle operator and the sunglasses.
Figure 7B:
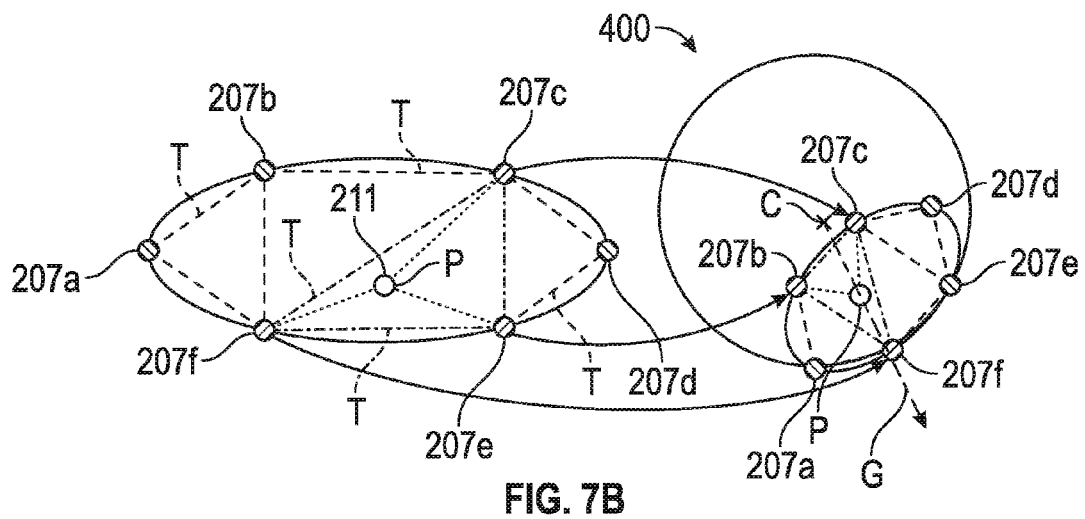
FIG. 7B is a schematic illustration depicting a process for obtaining the vehicle operator's gaze direction based on the position of the facial feature points and a 3D model of the vehicle operator's eye.

Step 108 entails detecting, via the controller 30, whether or not the vehicle operator D is wearing eyeglasses (e.g., corrective eyeglasses 302 or sunglasses 304) or is not wearing any eyeglasses based on the facial feature points 207, 210 as shown in FIG. 6. As used herein, the term "eyeglasses" refers to any type of corrective eyeglasses, sunglasses, goggles, protective eyeglasses or any other form of eyeglasses including lenses that cover the vehicle operator's eyes. If the vehicle operator D is wearing sunglasses 304, then the controller 30 determines the gaze vector $v_{gaze}$ based solely on the head pose angles (i.e., head yaw angle $\gamma_{yaw}$, head pitch $\gamma_{pitch}$, and head roll angle $\gamma_{roll}$). In other words, the controller 30 can determine the gaze vector $v_{gaze}$ solely on the 3D position and orientation of the vehicle operator's head DH when the vehicle operator D is wearing sunglasses 304. To detect whether the vehicle operator DH is wearing eyeglasses (e.g., corrective eyeglasses 302 or sunglasses 304), the controller 30 extracts scale-invariant feature transform (SIFT) descriptors from the facial feature points 207, 210 and concatenates them to build a feature vector. Then, a linear Support Vector Machine (SVM) classifier is used to estimate if the vehicle operator D is wearing eyeglasses (e.g., corrective eyeglasses 302 or sunglasses 304). Instead of the SVM classifier, any other suitable type of classifier may be used. The SVM classifier can be trained using numerous images from existing facial databases. If the vehicle operator D is wearing sunglasses 304, then the controller 30 determines the gaze vector $v_{gaze}$ based solely on the head pose angles. U.S. Patent Application Publication No. 2014/0205143, published on Jul. 24, 2014, the entire contents of which are incorporated by reference herein, describes an example of a method for determining whether the vehicle operator D is wearing eyeglasses (e.g., corrective eyeglasses 302 or sunglasses 304), and determining the gaze vector $v_{gaze}$ based on the head pose angles (i.e., head yaw angle $\gamma_{yaw}$, head pitch $\gamma_{pitch}$, and head roll angle $\gamma_{roll}$) if the vehicle operator is wearing eyeglasses. After determining the gaze vector $v_{gaze}$ based on the head pose angles, the method 100 continues to step 112. If the vehicle operator D is not wearing eyeglasses (e.g., corrective eyeglasses 302 or sunglasses 304), then the method 100 proceeds to step 110. In step 110, the controller 30 determines the vehicle operator's gaze direction based on the two-dimensional (2D) position of the facial feature points 211 and 207a, 207b, 207c, 207d, 207e, 207f (i.e., the rigid eye contour points) and 3D head model DHM of the vehicle operator's head DH (specifically the 3D model of the vehicle operator's eyes 400) as shown in FIG. 7B. First, the controller 30 estimates the 3D position of the vehicle operator's pupil P based on the facial feature points 211 and 207a, 207b, 207c, 207d, 207e, 207f (i.e., the rigid eye contour points), and then estimates the gaze direction based on the 3D pupil position and the eye center C. To estimate the 3D position of the pupil, the controller 30 triangulates the eye contour points (i.e., facial feature points 211 and 207a, 207b, 207c, 207d, 207e, 207f) in 2D in order to obtain an eye triangle mesh, which comprises a set of triangles T. Then, the controller 30 determines which triangle T in the eye triangular mesh contains the pupil P. Next, the controller 30 computes the barycentric coordinates of the pupil P inside the triangle T that contains the pupil P. Then, the controller 30 applies the barycentric coordinates to the corresponding eye contour points (i.e., facial feature points 207a, 207b, 207c, 207d, 207e, 207f) in 3D to obtain the 3D position of the pupil P. After obtaining the 3D position of the pupil P, the gaze direction can be determined (or at least estimated) as a ray G that extends through the center C of the 3D eye model 400 and the 3D pupil as shown in FIG. 7B. Only one driver's eye is used to estimate the ray G. The procedure to select the eye that is used in an given moment is the following. If the driver's head DH is oriented towards the X axis in FIG. 5, the right eye is used. On the contrary, if the driver's head is pointing in the direction −X in FIG. 5, the driver's left eye is used. It is envision that other combinations of the eyes directions can be used.

Step 112 entails determining the gaze vector $v_{gaze}$ based on the gaze direction (i.e., ray G) and then determining whether the gaze vector $v_{gaze}$ intersects a predetermined plane 34 defined along a windshield 23 of the vehicle 10 in order to detect whether the vehicle operator has the eyes on the road or off the road. Although in strict mathematical terms a plane is infinite, the predetermined plane 34 only encompasses the surface area within the dahe/shed lines identified in FIGS. 1 and 8. As discussed above, in step 112, the controller 30 determines the gaze vector $v_{gaze}$ solely on the 3D position of the vehicle operator's head DH if the vehicle operator D is wearing eyeglasses (e.g., corrective eyeglasses 302 or sunglasses 304). If the vehicle operator D is not wearing eyeglasses (e.g., corrective eyeglasses 302 or sunglasses 304), then the controller 30 first determines the gaze vector $v_{gaze}$ based on the 3D position of the vehicle operator's eye and the gaze direction (represented by a ray G). Accordingly, the controller 30 determines the gaze vector $v_{gaze}$ based, at least in part, of the 3D head model DHM of the vehicle operator's head DH. In step 112, the controller 30 determines whether the gaze vector $v_{gaze}$ intersects the predetermined plane 34 of the vehicle 10. For example, the predetermined plane 34 may be defined along the windshield 23. Thus, in step 112, the controller 30 can determine whether the gaze vector $v_{gaze}$ intersects the predetermined plane 34 of the windshield 23 at an intersection point $P_{inter}$ in order to determine if the vehicle operator D has the eyes on or off the road. Namely, the plane in which the area 34 may be expressed in vector notation as the set of points p that meet:

$$(p-p_0)^T n = 0$$

Where n is a normal vector to the plane, and $P_0$ is point in the plane. On the other hand, the gaze vector $v_{gaze}$ can be expressed as:

$$v_{gaze} = \lambda l + w, \ \lambda \in \mathbb{R}$$

Where l is the gaze direction (either obtained using the eye model, ray G, or the driver's head DH angles). The point w, is the origin of the ray, either the center of the corresponding eye, $t'_{eye}$, or the point 208 in the case that we use the driver's head to estimate the driver's gaze. Using this, the variable $\lambda$ can be computed as:

$$\lambda = \frac{(p_0 - w)^T n}{l^T n}$$

if $l^T n = 0$, the line and the plane are parallel. If $l^T n \neq 0$, there is a single point of intersection $P_{inter}$, see FIG. 8, and is given by:

$$P_{inter} \lambda l + w$$

If the gaze vector $v_{gaze}$ intersects the predetermined plane 34, then the controller 30 determines that the vehicle operator D has the eyes on the road, and the method 100 ends. Conversely, if the gaze vector $v_{gaze}$ does not intersect the predetermined plane 34, then the controller 30 determines that the vehicle operator D has the eyes off the road. Next, the method 100 proceeds to step 114.

In step 114, the controller 30 sends the alarm signal A (FIG. 1) to the indicator 32 in order to activate it (e.g., produce a sound and/or emit a visible light) when the gaze vector $v_{gaze}$ is outside a predetermined parameter. For example, the controller 30 can be specifically programmed to activate the indicator 32 when the gaze vector $v_{gaze}$ does not intersect the predetermined plane 34 of the windshield 23. Consequently, the indicator 32 is activated, thereby indicating to the vehicle operator D (by, for example, a sound and/or visible light) that the eyes are off the road. In step 114, the controller 30 may send the alarm signal A to the indicator 32 (to activate the indicator 32) only after a predetermined amount of time (e.g., two seconds) passed since the gaze vector $v_{gaze}$ did not intersect the predetermined plane 34 of the windshield 23.

While the best modes for carrying out the teachings have been described in detail, those familiar with the art to which this disclosure relates will recognize various alternative designs and embodiments for practicing the teachings within the scope of the appended claims. For example, the steps of the method 100 may be executed in a different chronological than the chronological order described above.

The invention claimed is:

1. A vehicle operator monitoring system, comprising:
a monocular camera configured to capture images in real time;
a controller in communication with the monocular camera, wherein the controller is specially programmed to:
receive image data of a head of a vehicle operator from the monocular camera;
track facial feature points in a face of the vehicle operator based on the image data;
create a three-dimensional (3D) model of the head of the vehicle operator based, at least in part, on the facial feature points in order to determine a 3D position and orientation of the head of the vehicle operator;
determine a gaze direction of the vehicle operator based on a position of at least some of the facial feature points and the 3D model of the head of the vehicle operator;
determine a gaze vector based on the gaze direction and the 3D position of the vehicle operator's head;
determine whether the gaze vector intersects a predetermined plane of a vehicle, the predetermined plane being defined as an area along a windshield of the vehicle, the gaze vector extending from the face of the vehicle operator toward the defined area along the windshield of the vehicle when the gaze vector intersects the predetermined plane, and the windshield of the vehicle being in front of the face of the vehicle operator; and
command an indicator to activate when the gaze vector does not intersect the defined area along the predetermined plane of the windshield of the vehicle.

2. The vehicle operator monitoring system of claim 1, wherein the predetermined plane is defined along a windshield of the vehicle.

3. The vehicle operator monitoring system of claim 1, further comprising an infrared (IR) illuminator configured to emit IR radiation toward the head of the vehicle operator.

4. The vehicle operator monitoring system of claim 3, wherein the monocular camera is characterized by the absence of an IR filter.

5. The vehicle operator monitoring system of claim 1, wherein the gaze direction is based on the facial feature points that are proximate a vehicle operator's eye.

6. The vehicle operator monitoring system of claim 5, wherein the controller is programmed to determine a 3D position of a vehicle operator's pupil based on the facial feature points that are proximate the vehicle operator's eye.

* * * * *